UNITED STATES PATENT OFFICE 2,393,608

UNSATURATED ETHERS OF HYDROXYDI-HYDRONORDICYCLOPENTADIENE

Herman A. Bruson, Philadelphia, Pa., assignor to The Resinous Products & Chemical Company, Philadelphia, Pa., a corporation of Delaware No Drawing. Application March 13, 1944, Serial No. 526,314

23 Claims. (Cl. 260—611)

This invention relates to ethers of hydroxydihydronordicyclopentadiene and an unsaturated monohydric alcohol.

This application is a continuation-in-part of my copending application Serial No. 476,640, filed February 20, 1943.

According to this invention, an unsaturated monohydric alcohol, ROH, wherein R is an unsaturated organic residue aliphatically bound to the hydroxyl group, is condensed with dicyclopentadiene in the presence of an acidic condensing agent as catalyst whereby addition of components of the alcohol to the terminal endomethylene double bond of the dicyclopentadiene occurs with a simultaneous molecular rearrangement of the latter to a hitherto unknown type of tricyclic ring system which, for the sake of brevity, has been termed the "nordicyclopentadiene" ring system. The product obtained is an ether of a hydroxydihydronordicyclopentadiene and is formed in accordance with the following equation, (A) representing the more probable configuration of the two possible isomers (A) and (B).

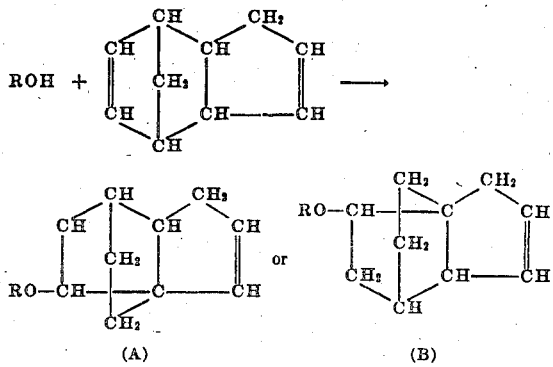

(A)                      (B)

The product is characterized by the presence of the ether group in an endoethylene cyclopentano cycle which forms one terminal cycle of the nordicyclopentenyl system, while the opposite terminal cycle consists of a five-membered ring having an olefinic linkage.

The dihydronordicyclopentadiene system is defined by the following structure:

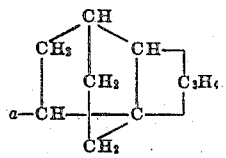

wherein $C_3H_4$ is a propenylene group which in conjunction with the adjoining carbon atoms forms a cyclopenteno ring, as one terminal cycle. As is evident from consideration of the above formulae, a functional group or substituent is attached at the point marked $a$ to a secondary carbon atom which is flanked by a methylene group and a tertiary carbon atom in an endoethylene cyclopentano group carrying the propenylene group which forms the cyclopenteno ring therewith.

The unsaturated monohydric alcohols used may be olefinic or acetylenic in character. Typical alcohols of this class include, for example, aliphatic and arylaliphatic alcohols, including allyl, methallyl, crotyl, 2-chlorallyl, propargyl, or cinnamyl alcohols, methyl vinyl carbinol, dimethyl ethynyl carbinol, geraniol, citronellol, oleyl alcohol, allyloxyethanol,

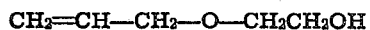

beta-(allyloxyethoxy)-ethanol,

the various pentenyl, hexenyl, octenyl, nonenyl, dodecenyl, tridecenyl and higher alcohols containing at least one double bond, and cycloaliphatic alcohols, including cyclohexenol, tetrahydro-$\Delta^3$-benzyl alcohol, 2,5-endomethylene-tetrahydro-$\Delta^3$-benzyl alcohol, 6-methyl-tetrahydro-$\Delta^3$-benzyl alcohol, 6-propyl-tetrahydro-$\Delta^3$-alcohol, 2,5-endomethylene-$\Delta^3$-6-methyl tetrahydrobenzyl alcohol, hydroxydihydronordicyclopentadiene, hydroxydihydronortricyclopentadiene, and the like.

Among the acidic condensing agents or catalysts which serve to promote the addition-rearrangement reaction are boron trifluoride and its coordination complexes with oxygenated compounds, sulfuric acid, its acid esters such as ethyl acid sulfate, aromatic sulfonic acids such as toluene sulfonic acid, aliphatic sulfonic acids such as butyl sulfonic acid, acidic salts such as zinc chloride, stannic chloride, titanium tetrachloride, antimonic chloride, aluminum chloride, ferric chloride; acidic siliceous clays such as that sold under the trade names of "Tonsil" or "Atapulgas," etc.

As examples of the coordination complexes of boron trifluoride, there may be cited those with ethers, typified by $BF_3.C_2H_5OC_2H_5$ and $BF_3.C_4H_9OC_4H_9$; with carboxylic acids, typified by $BF_3.2CH_3COOH$; with carboxylic esters, typified by $BF_3.2CH_3COOC_2H_5$; with ketones, typified by $BF_3.CH_3COCH_3$; with alcohols, typified by $BF_3.2C_4H_9OH$; and with water, which may be represented by $BF_3.(H_2O)_x$, $x$ being usually one or two.

The preferred catalysts are sulfuric acid and boron trifluoride or its coordination complexes. It is surprising to note that, though even in traces these catalysts promote polymerization of monomeric cyclopentadiene to resins in the absence of an alcohol, and also polymerize unsatprated ethers in general, they do neither to any appreciable degree in the case of a mixture of dicyclopentadiene and the unsaturated alcohols as described herein, but on the contrary promote the formation of highly reactive and useful unsaturated ethers by an addition-rearrangement reaction.

The quantity of active catalyst employed may be varied over a wide range. Good results have been obtained with as little as two per cent of catalyst on the weight of the dicyclopentadiene up to and exceeding a molecular equivalent of the catalyst per mol of dicyclopentadiene used. The catalysts need not be used under anhydrous conditions. In fact, the presence of water in small amounts often increases the rate of the reaction.

The addition-rearrangement reaction may be initiated by mixing the components and catalyst at temperatures even as low as 0° C. in some cases, or at room temperature, or at elevated temperatures. While it is generally desirable to keep the temperature low at the start, the reaction may be carried to completion or accelerated by raising the temperature or by continuing the reaction for a long time at a relatively low temperature. Temperatures as high as 100° C. to 150° C. may thus be used, the upper temperature being limited by the cracking tendency of the dicyclopentadiene to revert to monomeric cyclopentadiene. The reaction range of about 50° C. to 145° C. is generally the most useful and is to be preferred. The reaction can be controlled by the rate of mixing the reactants and by the use of a solvent or diluent, such as a hydrocarbon solvent including petroleum ethers or petroleum naphthas, or chlorinated hydrocarbons such as carbon tetrachloride, ethylene dichloride, tetrachlorethane and the like.

After the reaction has been carried to the desired point, the acidic condensing agent is removed as by washing with water or neutralization with an alkali, or both. The reaction product may then be distilled in many cases or otherwise purified, as by treatment with decolorizing clay or carbon, stripping, extraction, etc.

The following examples illustrate this invention, it being understood that the proportions, temperatures and time can be varied over a wide range without departing from the spirit of the invention.

Example 1

To a stirred mixture of 390 g. of dicyclopentadiene and 204 g. of beta-allyloxyethanol, $CH_2=CH-CH_2-O-CH_2CH_2OH$, heated to 55° C., there was added dropwise 14 g. of boron trifluoride-dibutyl ether complex, $BF_3.O(C_4H_9)_2$. The temperature of the mixture was then gradually raised to 125°–130° C. and held there for six and one-quarter hours with continuous stirring. A dark oil was obtained which was washed with hot, dilute sodium hydroxide solution and then with water. The oil was separated, dried, and distilled in vacuo.

The allyloxyethoxy-dihydronordicyclopentadiene having the probable formula

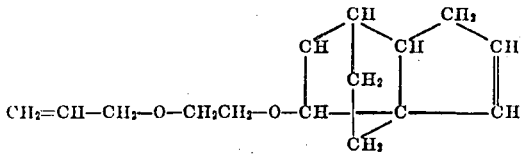

distilled over at 125°–130° C./2 mm. as a colorless oil in a yield of 360 g.

Upon redistillation, the pure product distilled at 125° C./3 mm.

Example 2

To 116 g. of allyl alcohol cooled to 0° C., 25 g. of 98% sulfuric acid was gradually added at such a rate that the temperature did not exceed 5° C. The solution was allowed to come to room temperature and was then mixed with 132 g. of dicyclopentadiene. This mixture was stirred and gradually heated on a steam bath under a reflux condenser. After the initial exothermal reaction, which carried the temperature of the mixture to 108° C., was over, the mixture was stirred for three hours at 95°–100° C., and poured into water. An oil layer separated. The oil was mixed with an equal volume of toluene, stirred with 5 g. of powdered lime, and filtered. The filtrate was distilled under reduced pressure.

The allyloxy-dihydronordicyclopentadiene distilled at 92°–95° C./2 mm. as a colorless oil having a pleasant, flowery odor. The yield was 106 g. Upon redistillation it boiled at 118° C./12 mm. and possessed the following constants $N_D^{25}$ 1.5000; $d_4^{25}$ 0.9960.

Example 3

A stirred mixture of 93 g. of 2-chloro-allyl alcohol and 145 g. of dicyclopentadiene was heated to 55° C., and 10 g. of $BF_3.O(C_4H_9)_2$ added. The exothermal reaction carried the temperature to 90° C. at which point cooling was applied. The mixture was then stirred and heated for six hours at 105° C., washed with hot dilute soda solution, then with water, dried, and distilled in vacuo. The 2-chloro-allyloxy-dihydronordicyclopentadiene

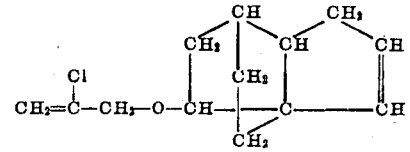

distilled over between 97° and 117° C./1 mm. as a colorless oil in a yield of 151 g.

Upon redistillation the pure compound boiled at 135° C./9 mm.

Example 4

To a stirred mixture of 268 g. of technical oleyl alcohol ("Ocenol") and 160 g. of dicyclopentadiene heated to 60° C. there was gradually added 7 g. of $BF_3.O(C_2H_5)_2$. The mixture was gradually heated to 125°–130° C. and held thereat for six hours. The product was then washed with hot dilute sodium hydroxide solution, then with water, filtered, and distilled in vacuo. The oleyloxy-dihydronordicyclopentadiene distilled over between 237° and 245° C./1 mm. as a pale yellow oil in a yield of 176 g.

Example 5

(a) A stirred mixture of 156 g. of citronellol, 198 g. of dicyclopentadiene and 7 g. of dihydroxyfluoboric acid, $BF_3.2H_2O$, was heated at 120°–125° C. for six and one-quarter hours. The product was then stirred with 20 g. of powdered sodium carbonate and 5 g. of water for one hour, then filtered and distilled in vacuo. The citronellyloxy-dihydronordicyclopentadiene distilled over between 155° and 180° C./1–2 mm. as a colorless oil in a yield of 170 g. Upon redistillation the pure compound boiled at 165° C./2 mm.

(b) In the same manner geraniol, used in place of the citronellol above, yielded geranyloxy-dihydronordicyclopentadiene as an oil boiling at 160° C./2 mm.

Example 6

A mixture of 134 g. of cinnamyl alcohol, 132 g. of dicyclopentadiene and 25 g. of $$BF_3 \cdot C_2H_5 - O - C_2H_5$$

was heated at 60°–65° C. for two hours.

The product was washed with hot, dilute sodium hydroxide solution, dried, and distilled in vacuo.

The cinnamyloxy-dihydronordicyclopentadiene distilled over as a pale yellow, viscous oil at 179°–182° C./2 mm.

Example 7

5 g. of $BF_3 \cdot C_4H_9 - O - C_4H_9$ complex was added dropwise to 62 g. of 2,5-endomethylene-$\Delta^3$-tetrahydro benzyl alcohol and 66.8 g. of dicyclopentadiene at 25°–27° C. during the course of two minutes. The mixture was stirred and heated at 90°–95° C. for six hours. It was then washed with dilute sodium hydroxide solution, then with water, dried and distilled. The product distilled over as practically a colorless oil, boiling at 145°–155° C./1–2 mm.

The unsaturated ethers of hydroxydihydronordicyclopentadiene, $R - O - C_{10}H_{13}$, wherein R is an unsaturated group, polymerize when heated with 5% benzoyl peroxide at 100° C. to viscous oils. They also polymerize to viscous liquids when blown with air at 80°–100° C. The resulting polymers, as well as the unpolymerized ethers themselves, when applied as coatings, rapidly absorb oxygen from the air to form varnish-like films, particularly in the presence of siccatives. They can, therefore, be used alone or in conjunction with natural fatty glycerides such as, for example, linseed oil, tung oil, soya bean oil, or dehydrated castor oil, or with alkyd resins to yield varnishes.

I claim:

1. An acid-catalyzed, addition-rearrangement product of an unsaturated alcohol and dicyclopentadiene, said product being an ether of the unsaturated alcohol and hydroxydihydronordicyclopentadiene, in which the alcohol residue is attached through oxygen to a secondary carbon atom flanked by a methylene group and a tertiary carbon atom in an endoethylene cyclopentano group carrying a propenylene group which forms a cyclopenteno ring therewith.

2. An acid-catalyzed, addition rearrangement product of an unsaturated monohydric alcohol and dicyclopentadiene, said product being an ether having the formula $R - O - C_{10}H_{13}$ wherein R is the hydrocarbon residue of an unsaturated alcohol and $-C_{10}H_{13}$ is the dihydronordicyclopentadienyl radical wherein the oxygen is attached to a secondary carbon atom flanked by a methylene group and a tertiary carbon atom in an endoethylene cyclopentano group carrying a propenylene group which forms a cyclopenteno ring therewith.

3. An acid-catalyzed, addition-rearrangement product of an unsaturated aliphatic alcohol and dicyclopentadiene, said product being an ether of the unsaturated aliphatic alcohol and hydroxydihydronordicyclopentadiene, in which the alcohol residue is attached through oxygen to a secondary carbon atom flanked by a methylene group and a tertiary carbon atom in an endoethylene cyclopentano group carrying a propenylene group which forms a cyclopenteno ring therewith.

4. An acid-catalyzed, addition-rearrangement product of an unsaturated olefinic monohydric alcohol and dicyclopentadiene, said product being an ether of the unsaturated olefinic monohydric alcohol and hydroxydihydronordicyclopentadiene, in which the alcohol residue is attached through oxygen to a secondary carbon atom flanked by a methylene group and a tertiary carbon atom in an endoethylene cyclopentano group carrying a propenylene group which forms a cyclopenteno ring therewith.

5. An acid-catalyzed, addition-rearrangement product of allyl alcohol and dicyclopentadiene, said product being an ether of allyl alcohol and hydroxydihydronordicyclopentadiene, in which the allyl nucleus is attached through oxygen to a secondary carbon atom flanked by a methylene group and tertiary carbon atom in an endoethylene cyclopentano group carrying a propenylene group which forms a cyclopenteno ring therewith.

6. An acid-catalyzed, addition-rearrangement product of oleyl alcohol and dicyclopentadiene, said product being an ether of oleyl alcohol and hydroxydihydronordicyclopentadiene, in which the oleyl nucleus is attached through oxygen to a secondary carbon atom in an endoethylene cyclopentano group carrying a propenylene group which forms a cyclopenteno ring therewith.

7. An acid-catalyzed, addition-rearrangement product of an unsaturated cycloaliphatic alcohol and dicyclopentadiene, said product being an ether of the unsaturated cycloaliphatic alcohol and hydroxydihydronordicyclopentadiene, in which the alcohol residue is attached through oxygen to a secondary carbon atom flanked by a methylene group and a tertiary carbon atom in an endoethylene cyclopentano group carrying a propenylene group which forms a cyclopenteno ring therewith.

8. An acid-catalyzed, addition-rearrangement product of 2,5-endomethylene-$\Delta^3$-tetrahydrobenzyl alcohol and dicyclopentadiene, said product being an ether of 2,5-endomethylene-$\Delta^3$-tetrahydrobenzyl alcohol and hydroxydihydronordicyclopentadiene, in which the 2,5-endomethylene-$\Delta^3$-tetrahydrobenzyl nucleus is attached through oxygen to a secondary carbon atom flanked by a methylene group and a tertiary carbon atom in an endoethylene cyclopentano group carrying a propenylene group which forms a cyclopenteno ring therewith.

9. A method for preparing ethers of hydroxydihydronordicyclopentadiene and unsaturated alcohols, which comprises reacting dicyclopentadiene with said alcohol in the presence of an acidic condensing agent.

10. A method for preparing ethers of hydroxydihydronordicyclopentadiene and unsaturated aliphatic alcohols, which comprises reacting dicyclopentadiene with said alcohol in the presence of an acidic condensing agent.

11. A method for preparing ethers of hydroxydihydronordicyclopentadiene and olefinic aliphatic alcohols, which comprises reacting dicyclopentadiene with said alcohol in the presence of an acidic condensing agent.

12. A method for preparing ethers of hydroxydihydronordicyclopentadiene and unsaturated alcohols, which comprises reacting dicyclopentadiene with said alcohol in the presence of sulfuric acid.

13. A method for preparing ethers of hydroxydihydronordicyclopentadiene and unsaturated alcohols, which comprises reacting dicyclopentadiene with said alcohol in the presence of a boron trifluoride catalyst.

14. A method for preparing ethers of hydroxydihydronordicyclopentadiene and an aliphatic alcohol having a double bond, which comprises reacting dicyclopentadiene and said alcohol in the presence of a boron trifluoride catalyst.

15. A method for preparing ethers of hydroxydihydronordicyclopentadiene and an aliphatic alcohol having a double bond, which comprises reacting dicyclopentadiene and said alcohol in the presence of a catalyst consisting of a coordination complex of boron trifluoride and an oxygenated organic compound.

16. A method for preparing an ether of hydroxydihydronordicyclopentadiene and allyl alcohol, which comprises reacting dicyclopentadiene with said alcohol in the presence of an acidic condensing agent.

17. A method for preparing an ether of hydroxydihydronordicyclopentadiene and an unsaturated cycloaliphatic alcohol, which comprises reacting dicyclopentadiene with said alcohol in the presence of an acidic condensing agent.

18. A method for preparing an ether of hydroxydihydronordicyclopentadiene and 2,5-endomethylene-$\Delta^3$-tetrahydrobenzyl alcohol, which comprises reacting dicyclopentadiene with said alcohol in the presence of an acidic condensing agent.

19. A method for preparing an ether of hydroxydihydronordicyclopentadiene and oleyl alcohol, which comprises reacting dicyclopentadiene with said alcohol in the presence of an acidic condensing agent.

20. The process of claim 16 wherein the catalyst is a boron trifluoride catalyst.

21. The process of claim 17 wherein the catalyst is a boron trifluoride catalyst.

22. The process of claim 18 wherein the catalyst is a boron trifluoride catalyst.

23. The process of claim 19 wherein the catalyst is a boron trifluoride catalyst.

HERMAN A. BRUSON.